US008335778B2

(12) United States Patent
Ghosh et al.

(10) Patent No.: US 8,335,778 B2
(45) Date of Patent: Dec. 18, 2012

(54) SYSTEM AND METHOD FOR SEMANTIC SEARCH IN AN ENTERPRISE APPLICATION

(75) Inventors: Rajesh Ghosh, Kalyani (IN); Phani Kishore Maddali, Guntur (IN); Keshava Rangarajan, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 362 days.

(21) Appl. No.: 12/212,178

(22) Filed: Sep. 17, 2008

(65) Prior Publication Data

US 2010/0070517 A1    Mar. 18, 2010

(51) Int. Cl.
*G06F 17/30* (2006.01)
(52) U.S. Cl. ........................... 707/708; 707/771
(58) Field of Classification Search .................. None
See application file for complete search history.

(56) References Cited

U.S. PATENT DOCUMENTS

| | | | |
|---|---|---|---|
| 6,629,097 B1 | 9/2003 | Keith | |
| 6,810,376 B1* | 10/2004 | Guan et al. | 704/9 |
| 7,155,715 B1 | 12/2006 | Cui et al. | |
| 7,249,100 B2 | 7/2007 | Murto et al. | |
| 7,426,526 B2 | 9/2008 | Chen et al. | |
| 7,668,818 B2* | 2/2010 | Hou et al. | 707/760 |
| 7,761,480 B2* | 7/2010 | Toledano et al. | 707/804 |
| 7,827,169 B2* | 11/2010 | Enenkiel | 707/718 |
| 7,987,176 B2* | 7/2011 | Latzina et al. | 707/713 |
| 2002/0174117 A1 | 11/2002 | Nykanen | |
| 2004/0098358 A1 | 5/2004 | Roediger | |
| 2004/0213409 A1 | 10/2004 | Murto et al. | |
| 2005/0182792 A1 | 8/2005 | Israel et al. | |
| 2005/0234889 A1* | 10/2005 | Fox et al. | 707/3 |
| 2006/0048155 A1 | 3/2006 | Wu et al. | |
| 2006/0053098 A1 | 3/2006 | Gardner et al. | |
| 2006/0053172 A1 | 3/2006 | Gardner et al. | |
| 2006/0165040 A1 | 7/2006 | Rathod et al. | |
| 2006/0184617 A1 | 8/2006 | Nicholas et al. | |
| 2007/0038609 A1* | 2/2007 | Wu | 707/3 |
| 2007/0055691 A1 | 3/2007 | Statchuk | |
| 2007/0106933 A1 | 5/2007 | Nene et al. | |
| 2007/0150387 A1 | 6/2007 | Seubert et al. | |
| 2007/0162467 A1 | 7/2007 | Wolber et al. | |
| 2007/0192351 A1 | 8/2007 | Liu et al. | |
| 2007/0208697 A1 | 9/2007 | Subramaniam et al. | |
| 2007/0226242 A1 | 9/2007 | Wang et al. | |
| 2007/0239674 A1 | 10/2007 | Gorzela | |

(Continued)

OTHER PUBLICATIONS

U.S. Appl. No. 12/356,314, filed Jan. 20, 2009, Notice of Allowance dated Nov. 22, 2011, 7 pages.

(Continued)

*Primary Examiner* — Fred I Ehichioya
*Assistant Examiner* — Michelle Owyang
(74) *Attorney, Agent, or Firm* — Kilpatrick Townsend & Stockton LLP (57) ABSTRACT

Embodiments of the present invention provide techniques for searching enterprise data using semantic information associated with enterprise applications. One or more searchable data definitions that describe searchable data associated with one or more enterprise applications may identify semantic relationships among searchable data in the application. An ontology for the application that describes semantic relationships among data associated with the application may be generated from the searchable data definitions. The ontology may be used to execute search queries and provide search results that include or result from semantic relationships among the searched data.

6 Claims, 4 Drawing Sheets

U.S. PATENT DOCUMENTS

| | | | |
|---|---|---|---|
| 2007/0244865 A1* | 10/2007 | Gordon et al. | 707/3 |
| 2007/0299813 A1 | 12/2007 | Subramaniam et al. | |
| 2008/0005194 A1 | 1/2008 | Smolen et al. | |
| 2008/0021881 A1 | 1/2008 | Subramaniam et al. | |
| 2008/0040308 A1* | 2/2008 | Ranganathan et al. | 707/1 |
| 2008/0091448 A1 | 4/2008 | Niheu et al. | |
| 2008/0126476 A1 | 5/2008 | Nicholas et al. | |
| 2008/0133960 A1 | 6/2008 | Wong et al. | |
| 2008/0168420 A1 | 7/2008 | Sabbouh | |
| 2008/0183674 A1 | 7/2008 | Bush et al. | |
| 2008/0215519 A1 | 9/2008 | Runge et al. | |
| 2008/0275844 A1 | 11/2008 | Buzsaki et al. | |
| 2009/0077094 A1 | 3/2009 | Bodain | |
| 2009/0150735 A1 | 6/2009 | Israel et al. | |
| 2009/0292685 A1 | 11/2009 | Liu et al. | |
| 2010/0010974 A1 | 1/2010 | Chieu et al. | |
| 2010/0017606 A1 | 1/2010 | Bradley et al. | |
| 2010/0057702 A1 | 3/2010 | Ghosh et al. | |
| 2010/0070496 A1 | 3/2010 | Ghosh | |
| 2010/0185643 A1 | 7/2010 | Rao et al. | |
| 2010/0228782 A1 | 9/2010 | Rao et al. | |

OTHER PUBLICATIONS

Author Unknown, "Jena Adaptor Release 2.0 for Oracle Database—README," Jena, Aug. 2008, 9 pages.
Author Unknown, "Oracle Database 11g Release 2 Semantic Technologies Using the Jena Adaptor for Oracle Database," Oracle Corporation, 2009, 24 pages.
Author Unknown, "Semantic Technologies Center," Oracle Corporation, [online], [retrieved on Dec. 29, 2009]. Retrieved from: http://www.oracle.com/technology/tech/semantic_technologies/index.html?_template=/oc.
Author Unknown, "SPARQL Protocol for RDF," W3C, [online], 2008, [retrieved on Aug. 16, 2011]. Retrieved from: http://www.w3.org/TR/2008/REC-rdf-sparql-protocol-20080115/.
Author Unknown, "Web Services Description Language (WSDL) Version 2.0: RDF Mapping", W3C, [online], 2007, [retrieved on Aug. 16, 2011]. Retrieved from: http://www.w3.org/TR/2007/NOTE-wsdl20-rdf-20070626/.
Bechhofer, S., et al, "OWL Web Ontology Language Reference", W3C, [online], 2004, [retrieved on Aug. 16, 2011]. Retrived from: http://w3.org/TR/2004/REC-owl-ref-20040210/.
Dickinson, I., "Jena Ontology API", Jena.Sourceforge.net, [online], 2009, [retrieved on Aug. 16, 2011]. Retrieved from: http://jena.sourceforge.net/ontology/index.html.
McBride, B., "An Introduction to RDF and the Jena RDF API", Jena.Sourceforge.net, [online], 2010 [retrieved on Aug. 16, 2011]. Retrieved from: http://jena.sourceforge.net/tutorial/RDF_API/index.html.
Munsinger, L., et al., "Oracle Application Development Framework Overview," Oracle Corporation, 2006, 11 pages.
Pollock, J., "A Semantic Web Business Case", W3C, 2008, 6 pages.
Sirin, E., et al., "Pellet: A Practical OWL-DL Reasoner", [online], [retrieved on Aug. 16, 2011]. Retrieved from: http://pellet.owldl.com/papers/sirin07pellet.pdf.
Wu, Z., et al., "Oracle Semantic Technologies Inference Best Practices with RDFS/OWL", Oracle Corporation, 2009, 11 pages.
U.S. Appl. No. 11/742,961, filed May 1, 2007, Notice of Allowance dated Mar. 9, 2010, 7 pages.
U.S. Appl. No. 11/742,961, filed May 1, 2007, Final Office Action dated Dec. 31, 2009, 23 pages.
U.S. Appl. No. 11/742,961, filed May 1, 2007, Office Action dated Jun. 22, 2009, 22 pages.
U.S. Appl. No. 12/201,308, filed Aug. 29, 2008, Advisory Action dated Nov. 9, 2011, 3 pages.
U.S. Appl. No. 12/201,308, filed Aug. 29, 2008, Final Office Action dated Aug. 26, 2011, 9 pages.
U.S. Appl. No. 12/201,308, filed Aug. 29, 2008, Office Action dated Jan. 18, 2011, 10 pages.
U.S. Appl. No. 12/210,420, filed Sep. 15, 2008, Final Office Action dated Nov. 9, 2011, 20 pages.
U.S. Appl. No. 12/210,420, filed Sep. 15, 2008, Office Action dated Apr. 6, 2011, 15 pages.
U.S. Appl. No. 12/393,872, filed Feb. 26, 2009, Final Office Action dated Aug. 16, 2011, 2 pages.
U.S. Appl. No. 12/393,872, filed Feb. 26, 2009, Office Action dated Mar. 2, 2011, 8 pages.
U.S. Appl. No. 12/356,314, filed Jan. 20, 2009, Office Action dated Jul. 22, 2011, 10 pages.
Alonso, et al., "Oracle Secure Enterprise Search 10g", An Oracle Technical White Paper, Mar. 2006, 20 pages.
Ford, et al., "Secure Searching with Oracle Secure Enterprise Search," An Oracle White Paper, Mar. 2006, 14 pages.
Risvik, et al., "Search Engines and Web Dynamics," Computer Networks, 39(3):289-302, 2002.
"Oracle® Spatial," Resource Description Framework (RDF), 10g Release 2 (10.2), B19307-01, Jul. 2005, 62 pages.
Oracle, "Classification, Clustering and Information Visualization with Oracle Text, An Oracle White Paper," Feb. 2003.
Oracle, "Information Visualization with Oracle 10g Text, An Oracle White Paper," Oct. 2005.
Oracle, "Text Mining with Oracle Text, An Oracle White Paper," Apr. 2005.
Oracle, "Oracle Text, An Oracle Technical White Paper," Jun. 2007.
Steve Muench, "Building a Web Store with Struts & BC4J Frameworks," Oracle Technology Framework, Sep. 2003.
Fast, "Powering Enterprise Search with Fast ESP", 2008.
Fast, "Fast ESP™, The World's Most Intelligent, Secure, High-Performance Search Platform," 2008 (#1, 2 pages).
Fast, "Fast ESP™, The World's Most Intelligent, Secure, High-Performance Search Platform," 2008 (#2, 7 pages).
Fast, "Fast ESP," available at http://www.fastsearch.com/13a.aspx?m=1031 (last visited Sep. 10, 2008).
Fast, "Search on Structured Data," available at http://www.fastsearch.com/13a.aspx?m=1104 (last visited Sep. 10, 2008).
Autonomy, "Automatic Classification and Taxonomy Generation," available at http://www.autonomy.com/content/Functionality/idol-functionality-categorization/index.en.html (last visited Sep. 10, 2008).
Autonomy, "Conceptual Search,"available at http://www.autonomy.com/content/Functionality/idol-functionality-conceptual-search/index.en.html (last visited Sep. 10, 2008).
Autonomy, "Natural Language Processing (NLP)," available at http://www.autonomy.com/content/Functionality/idol-functionality-nlp/index.en.html (last visited Sep. 10, 2008).
Autonomy, "IDOL Server," available at http://www.autonomy.com/content/Products/products-idol-server/index.en.html (last visited Sep. 10, 2008).
Oracle, "New Query Features in Secure Enterprise Search 10.1.8.2, An Oracle White Paper," Oct. 2007.
Oracle, "Oracle® Database, Semantic Technologies Developer's Guide, 11g Release 1 (11.1)," B28397-02, Sep. 2007.
Oracle, "Oracle® Secure Enterprise Search, Administrator's Guide, 10g Release 1 (10.1.8.2)," E10418-01, Sep. 2007.
OracleOwlPrime, "From Owl," Jan. 24, 2008.
Oracle, "Semantic Data Integration for the Enterprise, An Oracle White Paper," Jul. 2007.
Oracle, "New Features in Oracle Text with Oracle Database 11g Release 1, An Oracle White Paper," May 2007.
Searching Enterprise Applications (Siebel 7.8 and e-Business Suite 11i) with Oracle Secure Enterprise Search 10.1.8, An Oracle White Paper, Jan. 2007.
Oracle, "Searching Oracle Content Server (Stellent) with Oracle Secure Enterprise Search 10.1.8, An Oracle White Paper," Sep. 2007.
Oracle, "Secure Enterprise Search, One Search Across Your Enterprise Repositories: Comprehensive, Secure, and Easy to Use," Jan. 2007.
Oracle, "Secure Searching with Oracle Secure Enterprise Search, An Oracle White Paper," Jan. 2007.
Oracle, "Secure Enterprise Search, Version 10.1.8.2, An Oracle Technical White Paper," Oct. 2007.
Oracle, "Secure Enterprise Search, Version 1 (10.1.8), An Oracle Technical White Paper," Jan. 2007.

The Stanford Natural Language Processing Group, "Stanford Log-Linear Part-of-Speech Tagger," Jun. 6, 2008.
W3C, "Resource Description Framework (RFD): Concepts and Abstract Syntax," Feb. 10, 2004.
W3C, "OWL Web Ontology Language Reference," Feb. 10, 2004.
W3C, "RDF Primer," Feb. 10, 2004.
W3C, "RDF Semantics," Feb. 10, 2004.
W3C, "SPARQL Query Language for RFD," Jan. 15, 2008.
W3C, "RDF/XML Syntax Specification (Revised)," Feb. 10, 2004.
W3C, "RDF Test Cases," Feb. 10, 2004.
W3C, "RDF Vocabolary Description Language 1.0: RDF Schema," Feb. 10, 2004.
Oracle, "Oracle 9*i*, XML Developer's Kits Guide—XDK, Release 2 (9.2)," Mar. 2002.

* cited by examiner

RELATED ART

SYSTEM AND METHOD FOR SEMANTIC SEARCH IN AN ENTERPRISE APPLICATION

CROSS-REFERENCES TO RELATED APPLICATIONS

This application is related to co-pending applications entitled "System and Method for Searching Enterprise Application Data," U.S. patent application Ser. No. 12/201,308, filed Aug. 29, 2008 and "Searchable Object Network," U.S. patent application Ser. No. 12/210,420, filed Sep. 15, 2008, the disclosure of each of which is incorporated by reference in its entirety for all purposes.

BACKGROUND OF THE INVENTION

The present invention relates to enterprise systems, and more particularly to techniques for manipulating searchable data and semantic information associated with applications in an enterprise system.

Many businesses and other organizations use software applications and/or suites of such applications to organize their business affairs, track business performance, manage employee data and perform similar functions. These enterprise applications are often quite complex, relying on numerous database tables to store and manage data for virtually every aspect of an organization's business. Exemplary enterprise applications can include supply chain management ("SCM") applications that manage raw materials, work-in-process and/or finished products, and coordinate with suppliers; customer relations management ("CRM") applications that are used to track, store and/or manage customer information; financial applications that track and/or analyze the financial performance of the organization; human resources applications that provide management of the human resources functions of the organization, and other applications. In some cases, these applications are standalone applications; in other cases, a single business application or suite of applications might provide some or all such functionality. Specific, non-limiting examples of enterprise applications include JD Edwards EnterpriseOne, PeopleSoft Enterprise applications (including, for example, PeopleSoft Enterprise Student Administration), and the Oracle eBusiness Suite, all available from Oracle Corporation.

Enterprise applications typically store and process business data in one or more data stores. In one configuration, the data is stored in one or more tables of a database managed by a relational database management system ("RDBMS") and maintained by the business application. Each enterprise application may use a separate data store, which may be an independent database or portion of a database. Thus, for example, where a business system includes a CRM application and an enterprise resource planning ("ERP") application, the CRM application may use a data store separate from the ERP application. Each application typically maintains and manages the data stored in its data store.

A relational database typically is designed to reduce or minimize redundancy in stored data by structuring the database tables to store data in a normalized form. This can result in a single business object being stored across multiple database tables. The stored data also may include information describing semantic relationships among objects represented by the stored data. Structured queries may be used to extract data from the relevant tables for processing and/or presentation to an end user of the business system. However, data stored in relational databases typically may not be stored or directly accessible in a format conducive to text searching, presentation to end users, or other context-related manipulation. Further, merely converting the stored data into a format that is more conducive to searching may ignore or lose information describing semantic relationships within the data.

In some search regimes, a search engine typically matches terms in a search query to indexed searchable data. The search results typically reflect whether and how the searchable data matches the search terms. For example, a data source that matches all of the search terms may be considered a good match and provided as a search result, while a data source that matches few or no terms may be considered a poor match and provided as a poor search result, or not provided as a matching result at all. Although additional logic may be employed to match search terms, these searches are unable to identify or make use of semantic relationships that may be present among the indexed data.

BRIEF SUMMARY OF THE INVENTION

Embodiments of the present invention provide techniques for searching enterprise data using semantic information associated with enterprise applications. One or more searchable data definitions that describe searchable data associated with one or more enterprise applications may identify semantic relationships among searchable data in the application. An ontology for the application that describes semantic relationships among data associated with the application may be generated from the searchable data definitions. The ontology may be used to execute search queries and provide search results that include or result from semantic relationships among the searched data.

In an embodiment, a method of generating an ontology for an enterprise application may include generating at least one semantic statement about the searchable data based on a searchable data definition, where the searchable data definition identifies searchable data associated with the application and a location of the searchable data; based on the searchable data definition, generating at least one rule describing entities described by the searchable data; and storing an ontology comprising the at least one semantic statement and the at least one rule. The ontological statement may be generated by identifying a semantic relationship between entities associated with data described by the searchable data definition and constructing the ontological statement to describe the semantic relationship. The semantic relationship may be specified by the searchable data definition. A vocabulary of terms for use in the application ontology may be generated based on the searchable data definition. The vocabulary of terms may include, for example, entities associated with the application. The ontological statement may be a structured statement such as a resource description framework (RDF) statement.

In an embodiment, a method of performing a semantic search may include receiving a query; parsing the query to identify at least one term in the query that matches a vocabulary associated with an application; identifying an ontology associated with the application that comprises the at least one term; generating a second query from the query, the second query being formatted to query the ontology; and executing a search of the ontology using the second query. A third, non-semantic search query may be generated from the query and executed, and search results that include the results obtained from executing the second query and results obtained from executing the third query may be provided. The semantic query may be a structured query, such as a SPARQL query.

In an embodiment, a method of performing a hybrid search may include receiving a query associated with an application; parsing the query to identify at least one term in the query that matches a vocabulary associated with an application; searching an ontology associated with the application to determine whether the matched term is included in the ontology; and determining whether the term is included in the ontology. If the term is included in the ontology, a semantic search may be performed based on the matched term and the ontology and adding semantic search results obtained from performing the semantic search to a set of search results. If the term is not included in the ontology, the query may be processed as a non-semantic query and adding the search results to the search results. Appropriate search results from executed queries may then be provided to a user. When the term is included in the ontology, the method may also include generating a non-semantic query from the query, executing the non-semantic query; and presenting results of executing the non-semantic query and the search results

DETAILED DESCRIPTION OF THE INVENTION

Embodiments of the present invention provide techniques for searching enterprise data using semantic information associated with enterprise applications. One or more searchable data definitions that describe searchable data associated with one or more enterprise applications may identify semantic relationships among searchable data in the application. An ontology for the application that describes semantic relationships among data associated with the application may be generated from the searchable data definitions. The ontology may be used to execute search queries and provide search results that include or result from semantic relationships among the searched data.

As used herein, an application ontology is a formal representation of knowledge available in the application. An application ontology may include data related to the application and relationships between the data. For example, an application ontology may include classes and attributes of entities associated with the application, relationships between the entities, and rules governing behavior of the entities within the application. The application ontology may include a collection of statements that provide semantic information about entities associated with the application, or a framework for generating such statements. Typically, the entities described by an application ontology are at least partly embodied in searchable data associated with the application and described by one or more searchable data definitions.

The number of ontologies associated with an enterprise system and their relationship to enterprise applications in the system may be determined by the expected use of the ontologies. For example, where an overall search function or mechanism is provided for the enterprise system, a single ontology for the system may be used, which may span multiple applications in the system. Similarly, separate ontologies may be used for each application or group of applications. An ontology may be application-independent, or it may be linked to a specific application. As used herein, an ontology may be described with respect to or as associated with a specific application. Unless specifically indicated otherwise, it will be understood that an ontology may be associated with more than one enterprise application, and/or an enterprise application may be associated with more than one ontology.

An application ontology may be generated for unstructured data by assigning attributes to entities in a system. For example, the Web Ontology Language (OWL) is an ontology framework that uses RDF statements to describe entities available on the WWW. The OWL specification is available from the W3C.

In contrast, enterprise application data typically includes structured data, such as data stored in a relational database. As previously described, such data may stored in the database in a format not conducive to direct searching or access by a user. For example, a single entity may be described or defined by data stored across multiple database tables. Unlike an ontology intended to describe unstructured or non-relational data such as general data available on the WWW, it may be difficult or impossible for an application ontology intended to describe structured or relational data to be constructed merely by examining the stored data. For example, it may not be possible to create an application ontology to describe structured data associated with an enterprise application based on the structure and/or content of the database tables that store the data. However, such structured data may include searchable data or data that can be converted to searchable data, which may be suitable for generating an ontology. For example, entities such as "Work Order," "Purchase Order," and "Sales Order" that are associated with an enterprise application may belong to a common "Orders" class of business objects. This and similar hierarchical relationships may not be apparent from the way in which the entities are stored, such as in a relational database or other storage mechanism. In some cases, it also may not be feasible to derive such relationships based on the stored data. Therefore, to create an application ontology for an enterprise application, one or more searchable data definitions may be used to identify and access searchable data associated with the application and construct the application ontology. Logical aggregation and representation of class hierarchies may be possible using such searchable data definitions. For example, for a search query such as "orders where item Laptop Type A is used", an ontological representation of data associated with the enterprise application processing the search query may provide relevant information from multiple kinds of "Orders" without having to perform a separate search of each associated object.

An application ontology may include structured statements or formats. An ontological statement may provide semantic information regarding one or more entities or types of entities associated with the application. As a specific, non-limiting example, an application ontology according to embodiments of the invention may include ontological statements formulated according to a resource description framework (RDF). RDF and related specifications are available from the World Wide Web Consortium (W3C). In an embodiment, an ontological statement may include one or more terms, each of which may be a subject, a predicate, an object, or a combination thereof. A subject identifies the entity that the statement describes, a predicate identifies the property, characteristic, relationship, or attribute of the subject, and the object identifies the value of the predicate. As a specific example, an application ontology for a purchasing application may include the ontological statement "Purchase Order X has an owner that is Business Corp" or "Purchase Order X is owned by Business Corp." In the example, "Purchase Order X" is the subject, "owner/own" is the predicate, and "Business Corp" is the object. As with RDF and ontologies based thereon, subjects, predicates, and objects may be represented by triples of Uniform Resource Indicators (URIs). The URIs may identify locations of searchable data corresponding to the entities described by ontological statements. Any other suitable storage mechanisms and definitions may be used.

The use of an application ontology to represent data and the relationships between data associated with an enterprise application may provide additional information not typically available to a user of the application, or in a more convenient or readable format that would otherwise be possible. For example, a natural-language or other search query provided by a user may be processed more efficiently than with other search processing techniques due to inferencing capabilities created by the application ontology. As a specific example, a search query of "purchase orders of ExampleCo shipped from Tokyo" can be interpreted in an apparently single-step operation to the user. In contrast, other search processing methodologies may have to first search for the vendor ExampleCo, identify related purchase orders, then select only those purchase orders for which a product was shipped from Tokyo.

According to an embodiment, an application ontology may include a vocabulary of classes and terms allowed in semantic statements included in the ontology. For example, an application ontology for a payroll application may use classes such as "employee" and "contractor," and associated properties such as "name," "salary," "department," etc. In general, a class refers to a type of entity in the ontology, and each entity in the class can have various values associated with one or more properties. These entities, classes, properties, and combinations thereof may be used as the terms in semantic statements in the application ontology. The semantic statements and vocabulary in an application ontology may be constructed without end-user intervention, such as where a semantic search system accesses searchable data definitions to identify appropriate terms and construct semantic statements, or they may be defined or selected by a user.

Figure 1:
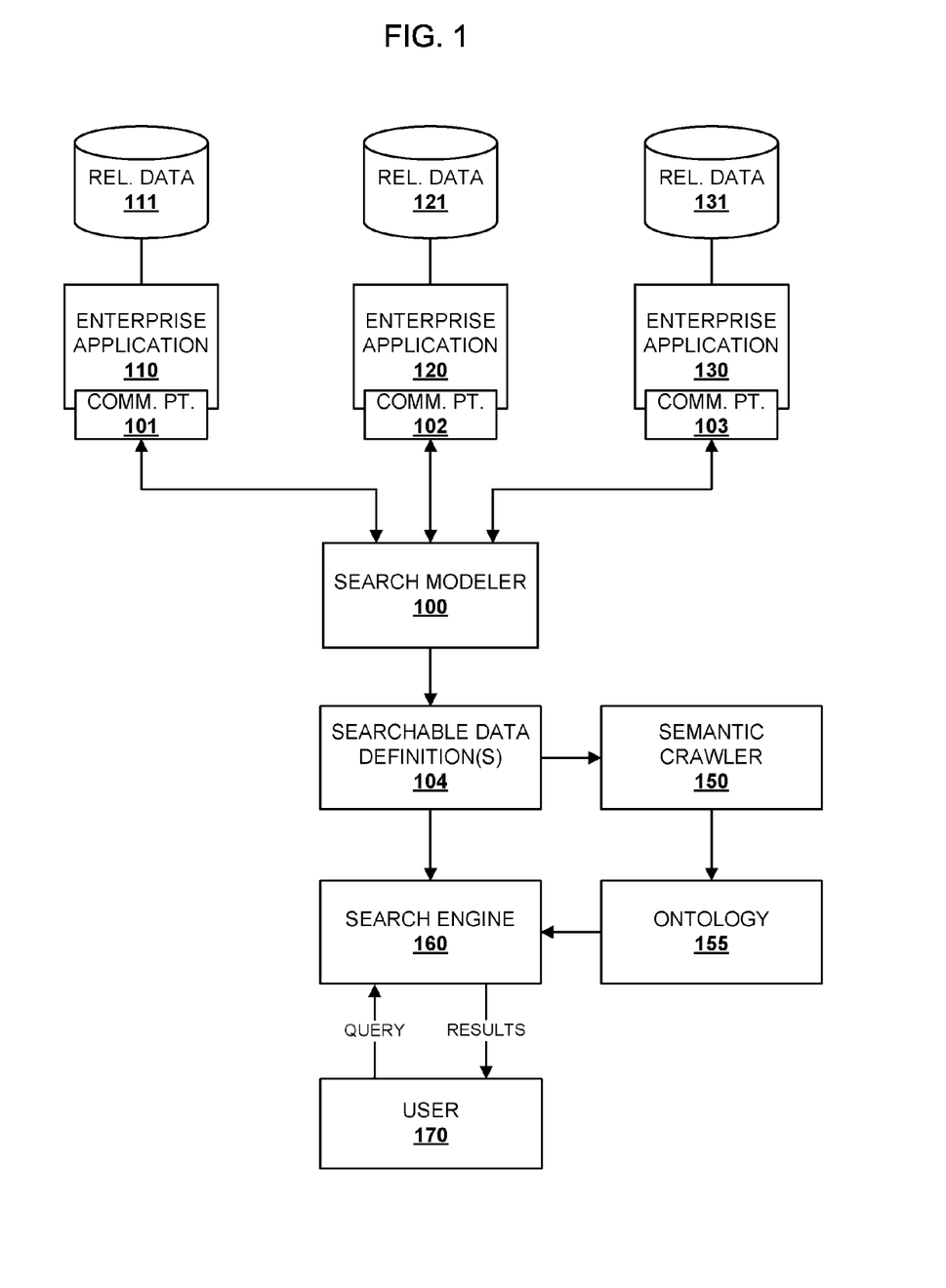
FIG. 1 shows a simplified block diagram of a system having a search modeler that generates searchable data definitions according to an embodiment of the invention.

FIG. 1 shows a simplified block diagram of a system having a search modeler 100 that generates searchable data definitions 104 according to an embodiment of the invention. The search modeler 100 communicates with enterprise applications 110, 120, 130 via communications points 101, 102, 103, respectively. Each enterprise application may include a data store 111, 121, 131, respectively, that stores data used by, generated by, or otherwise associated with the application.

The data stores may be implemented as one or more tables of a database managed by a relational database management system ("RDBMS") and maintained by the enterprise application. Each application typically maintains and manages the data stored in its data store. A relational database typically is designed to reduce or minimize redundancy in stored data by structuring the database tables to store data in a normalized form.

The search modeler 100 may provide information describing the location of searchable data within the enterprise applications. For example, the search modeler may indicate database tables or other storage mechanisms in the data store 111, 121, 131 that store searchable data, and provide a description of each item's structure and relation to other storage mechanisms in the data stores 111, 121, 131. The search modeler 100 may create searchable data definitions 104 that provide information about the searchable data associated with each application accessible to the search modeler 100. In some embodiments, multiple searchable data definitions may be created for each application. In some embodiments, searchable data definitions may span multiple enterprise applications, such as where the searchable data definition for a first application links to the searchable data definition for a second application. The one or more or more searchable data definitions for an application may be referred to herein as a searchable data model for the application.

In an embodiment, a semantic crawler 150 may access and process a searchable data definition 104 to identify semantic relationships embodied in the data described by the searchable data definition. As used herein and as described in further detail below, a semantic relationship exists where information about logical entities associated with application data may be identified based on the meaning of the logical entities and data in the application, as opposed to the content of the data itself. As used herein, a "logical entity" refers to a business object or similar construct in an enterprise application. The term "logical entity" is used to distinguish from an "object" as used in, for example, an RDF subject/object/predicate statement, although it will be apparent that one or more logical entities may be described by a "searchable object definition." In general, a semantic crawler is a program that accesses data structures or searchable data and identifies semantic information therefrom. A semantic crawler 150 may parse the searchable data identified by a searchable data definition to identify and describe semantic relationships present in the data. In an embodiment, semantic relationships may be described using one or more ontological statements, such as RDF statements. The semantic crawler also may construct a vocabulary that identifies terms appropriate for the searchable data. An ontology 155 including the semantic statements, vocabulary, or a combination thereof may be created and stored in the enterprise system.

A search engine 160 and one or more associated crawlers may index searchable data described by the searchable data definitions. Further details regarding the structure and operation of the search modeler and searchable object definitions, and the indexing and use of data identified by searchable data definitions are provided in co-pending applications entitled "System and Method for Searching Enterprise Application Data," U.S. patent application Ser. No. 12/201,308, filed Aug. 29, 2008 and "Searchable Object Network," U.S. patent application Ser. No. 12/210,420, filed Sep. 15, 2008.

The search engine 160 also may access and process an application ontology 155 to execute searches that use or provide semantic information described by the ontology. When a user 170 wishes to search data in the enterprise system, he may submit a query to the search engine 160. The query may include one or more keywords, a plain language query, Boolean terms, or any other query structure. The search engine 160 may execute the query by performing an appropriate search of data described by the searchable data definitions. The search engine may provide search results, such as data that matches the specific terms provided in the query.

In addition to providing search results that match query terms, search engine 160 also may perform a semantic search using information contained in the application ontology 155. For example, the semantic search may be performed based upon entities represented on the application ontology 155. The results of the semantic search may comprise information determined based on semantic information related to the entities contained in the application ontology. Further details related to performing a semantic search are described below with respect to FIG. 3.

Figure 2:
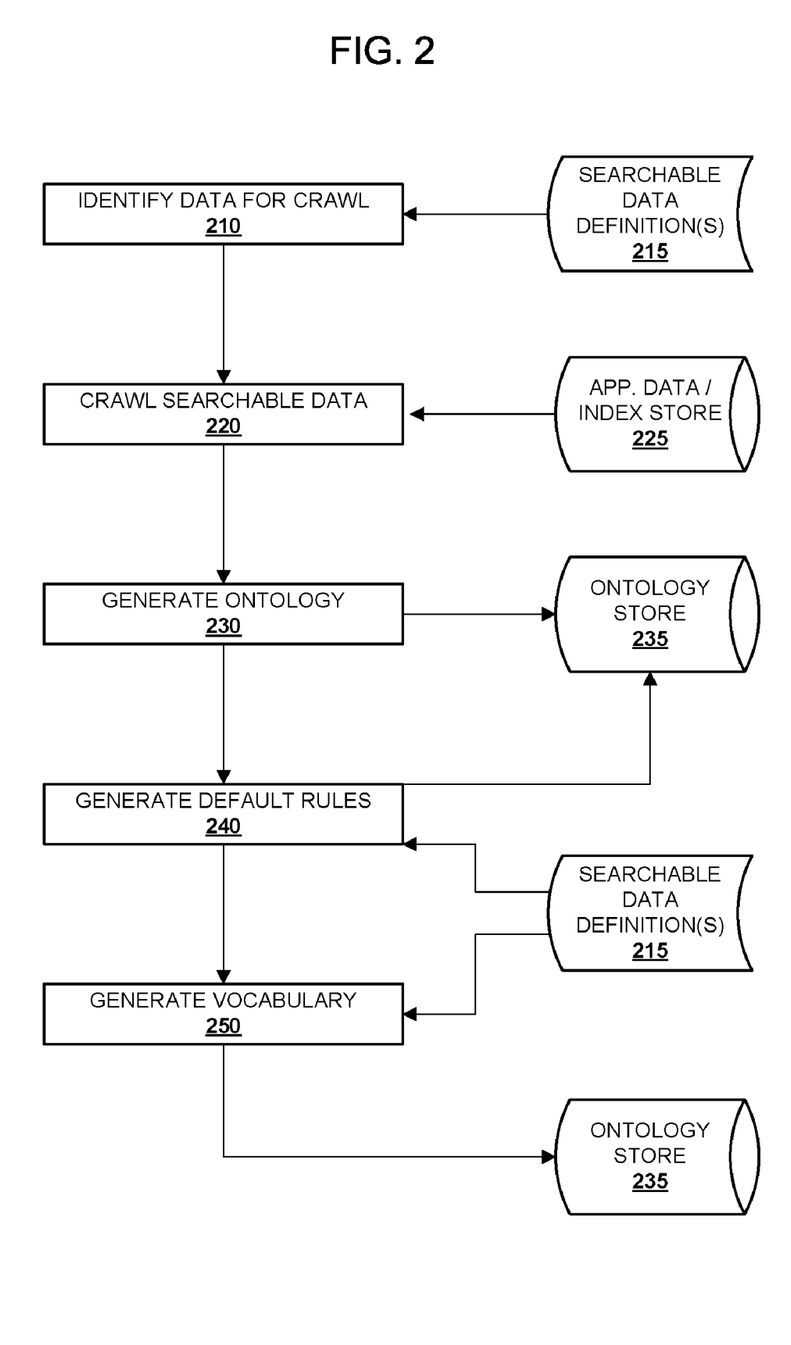
FIG. 2 shows a simplified, example process for generating an ontology for an enterprise application.

FIG. 2 shows a simplified process for generating an application ontology for an enterprise application. At 210, searchable data associated with the application may be identified, such as by a semantic crawler, based on a description of the searchable data contained in one or more searchable data definitions 215 previously created by a search modeler. The searchable data definitions may identify logical entities associated with an enterprise application and describe data associated with those entities. The semantic crawler may then access the searchable data definitions associated with a given application to construct a representation of facts related to a specific entity.

For example, a searchable data definition may list tables in a relational database associated with the application that contain searchable data, and indicate a relationship between application entities associated with the data in the tables. The searchable data identified in 210 may be "crawled" (220) by systematically accessing and processing the searchable data 225 described by the searchable data definition. At 230, an ontology may be defined based on information in the searchable data definition, data received during the crawl (220), or both. A crawler may generate the application ontology by identifying semantic relationships between entities and types of entities described by the searchable data 225. For example, the application ontology may indicate that one type of entity, such as a purchase order, is owned by or otherwise associated with another type, such as a business partner. Similarly, the ontology may indicate semantic relationships between two or more entities, such as indicating that "Business Partner XYZ" owns "Purchase Order 1" and "Purchase Order 2."

As another specific example, a logical entity in an enterprise application may be a Vendor business object. Facts about the Vendor entity may be semantically represented, such as in RDF triplets. An instance of the entity Vendor may be a specific vendor, such as "ComputerMaker, Inc." RDF triplets associated with Vendor—ComputerMaker, Inc. may be, for example:

```
@prefix rdf: <http://www.w3.org/1999/02/22-rdf-syntax-ns#> .
@prefix vendor: <http://www.oracle.com/AppSearch/Vendors> .
@prefix prop: <http://www.oracle.com/AppSearch/Properties#>.
vendor: ID30163    prop: VendorID      30163;
                   prop: VendorNumber  20186;
                   prop: VendorName    ComputerMaker, Inc.
                   prop: VendorType    STANDARD.
```

Other triplets may be created, and similar triplets may be created for other specific vendors in the application. Each triplet may be read as providing an individual piece of information about the described vendor.

A searchable object network as described in a co-pending application entitled "Searchable Object Network," U.S. patent application Ser. No. 12/210,420, filed Sep. 15, 2008, also may be used to generate the ontology. For example, a searchable object network may indicate that two logical entities associated with an application share a common attribute, indicating a semantic relationship between the logical entities. This relationship may be included in the application ontology to allow for searching or other manipulation of the data associated with the logical entities based on the semantic relationship.

Continuing the "ComputerMaker" example from above, the Vendor logical entity may be semantically-related to a Purchase Orders logical entity. Example Purchase Order triples for a specific purchase order "Purchase Order PO123456" may be, for example:
@prefix rdf: <http://www.w3. org/1999/02/22-rdf-syntax-ns#>.
@prefix po: <http://www.oracle.com/AppSearch/Purchase-Orders>.
@prefix prop: <http://www.oracle.com/AppSearch/Properties#>.

```
po: ID9999    prop: PoHeaderId   9999
              prop: PoNumber     123456
              prop: PoDate       '01-Aug-2008'
              prop: PoType       STANDARD
              prop: PoCurrency   USD
              prop: VendorId     30163
              prop: VendorSite   Tokyo
``` where :PoHeaderId, :PoNumber, :PoDate etc. are searchable attributes of the Purchase Order logical entity, as defined by a search modeler.
A corresponding PO Line may be, for example:
@prefix rdf: <http://www.w3. org/1999/02/22-rdf-syntax-ns#>.
@prefix PO_Lines: <http://www.oracle.com/AppsSearch/PO_Lines>.

```
PO_Lines: ID8346-1   rdf: PoHeaderId       8346;
                     Rdf: PoLineNum        1;
                     rdf: ItemCategory     Network;
                     rdf: ItemDescription  test item for IP load;
                     rdf: UOMCode          Each;
                     rdf: Quantity         10.
```

PoHeaderId, PoNumber, PoDate etc are the searchable attributes of Purchase Order logical entity, as defined through Search Modeler.

The same Purchase Order instance may be represented in RDF XML form:

```
<?xml version="1.0" encoding="utf-8"?>
<rdf:RDF xmlns:rdf="http://www.w3.org/1999/02/22-rdf-syntax-ns#"
    xmlns:po="http://www.oracle.com/AppSearch/Purchase_Orders">
    xmlns:prop="http://www.oracle.com/AppSearch/Properties">
  <rdf:Description
rdf:about="http://www.oracle.com/AppSearch/Purchase_Orders#ID9999">
    <prop:PoHeaderId>9999</prop:PoHeaderId>
    <prop:PoNumber>123456</prop:PoNumber>
    <prop:PoDate>01-AUG-2008</prop:PoDate>
    <prop:PoType>STANDARD</prop:PoType>
    <prop:PoCurrencyCode>USD</prop:CurrencyCode>
    <prop:VendorId>30163</prop:VendorId>
    <prop:VendorSite>Tokyo</prop:VendorSite>
  </rdf:Description>
</rdf:RDF>
```

The relationship between the Vendor and Purchase Order entities may be defined by a search modeler and mapped as Rules. For example, the following rules may be defined:
Rule_Purchase_Orders_Vendors
  '(?x prop:VendorId ?o)
    (?x prop:VendorNumber ?vnum)
    (?x prop:VendorType ?vtype)
    (?y prop:VendorId ?o)
    (?y ?prop ?obj)',
  '(x !=y)',
  '(?x ?prop ?obj)',
The example rule identifies a subject 'x' as instances of a Vendor logical entity that contains the VendorId, VendorNumber and VendorType properties. This is related to any other subject 'y' which has a VendorId property that matches the VendorId of 'x'. The specific syntax of rules used to define relationships between entities may vary depending on the semantic storage system used. For example, the syntax shown above may be used with the Oracle Database 11 g Semantic Engine.

An application ontology may include a semantic framework such as a, a collection of semantic statements such as RDF statements, or a combination thereof. Other semantic frameworks may be used.

An application ontology may be stored, such as in a relational database 235 or other storage mechanism. In some cases, the application ontology is stored in a database for the appropriate enterprise application, or it may be stored in an ontology store used by multiple enterprise applications. A specific, non-limiting example of an ontology store is the ontology storage feature available in the ORACLE 11 G database system. An ontology store may include a management system, similar to an RDBMS, that can interpret and execute structured queries in an ontological query language. An ontology stored in such a system may be referred to as a "structured" ontology, and may be accessed using methods similar to other structured data stores such as relational databases. As a specific example, the SPARQL Protocol and RDF Query Language (SPARQL) as published by the W3C may be used an ontology query language for querying RDF ontologies. A semantic search query such as a SPARQL query may be used for efficient access to a structured ontology. In an embodiment, an ontology store may include a database management system configured to execute structured semantic queries such as SPARQL queries.

An application ontology also may include one or more rules that place restrictions on entities described by the ontology. Default rules may be specified. The rules may specify the types of relationships that can be described in the application ontology. As a specific example, a rule in a purchasing application ontology may specify that a purchase order can only be owned by a single business partner. The rules may be generated based on the data crawled at step 220, metadata in the searchable data definitions accessed in 210, constraints in the related application, or a combination thereof. For example, in an embodiment, a searchable data definition may explicitly indicate a rule that should be included in an application ontology. Rules may be set and used for a variety of purposes. As a specific example, a rule may describe how an instance of an entity is related to other entities. For example, a rule may specify how a Vendor entity is related to Purchase Orders owned by the Vendor. Rules also may enforce restrictions or provide weighting of search results. As another specific example, a business rule in an enterprise application may require selection of vendors with a Key Performance Indicator (KPI) rating of at least 50. When an end-user such as a purchasing manager searches for "suppliers for item ABC," the system may return results that exclude vendors having a KPI below 50. Other business rules and requirements may be enforced or recorded by rules. Class-level relationships also may be defined within an ontology, such as by using OWL-Prime and similar methods.

At 250, a vocabulary may be generated for the ontology. A vocabulary for an ontology lists terms that can be used in constructing semantic statements that describe relationships between entities described by data associated with an application. The vocabulary may be generated automatically based on metadata in one or more searchable data definitions, or it may be partially or entirely specified by a user. The vocabulary may be stored in the ontology store 235.

Figure 3:
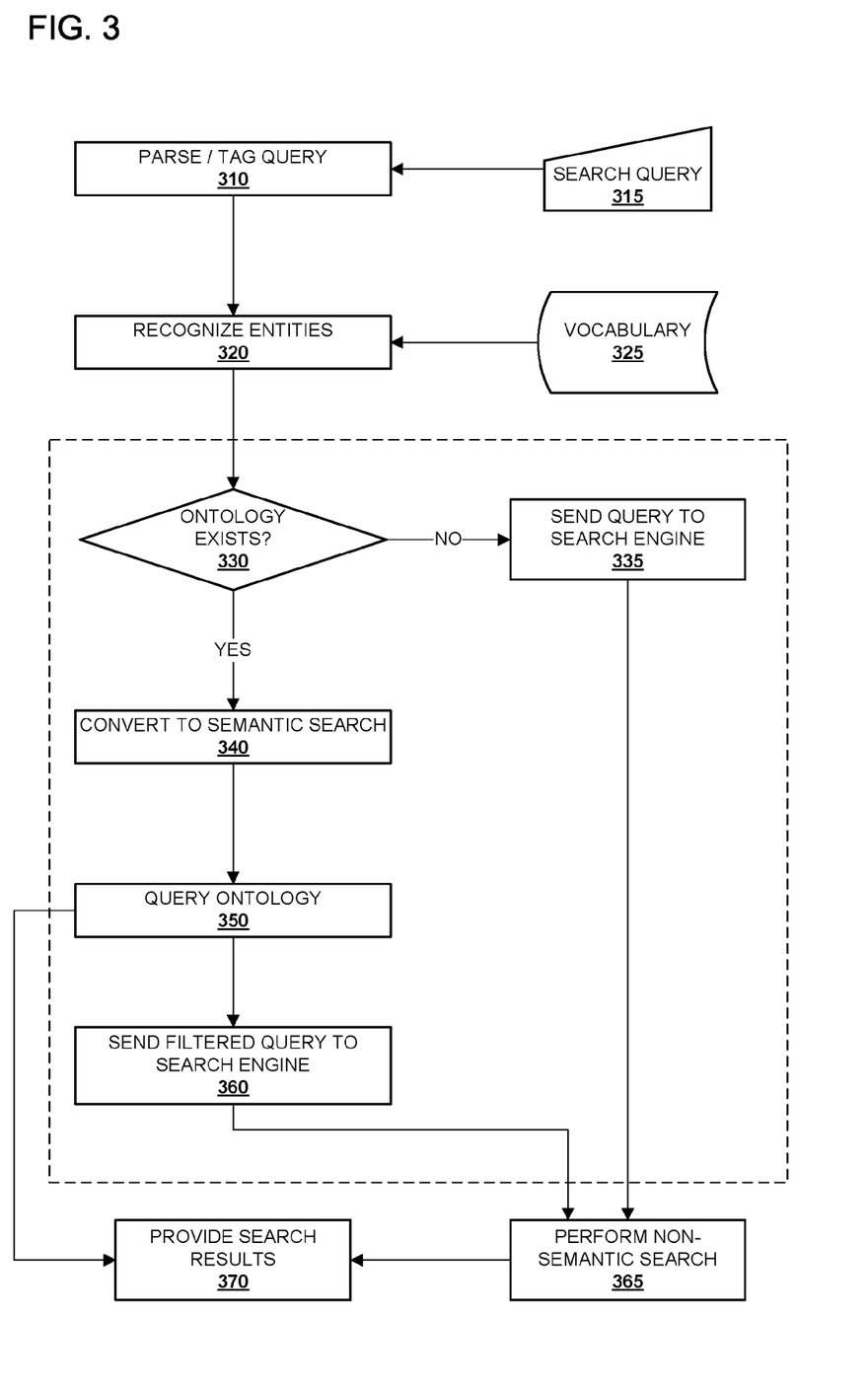
FIG. 3 shows a simplified example of a process for performing a search using an ontology.

In an embodiment, an application ontology may be used to execute a semantic search. FIG. 3 shows a simplified example of a process for performing a semantic search using an ontology. At 310, a search query 315 is received and parsed for potential semantic entities. A set of tagged keywords may be generated for the query, as described in further detail below. The query terms may be compared to a vocabulary 325 that may have been generated as described with respect to FIG. 2. At 320, query terms or phrases that match vocabulary terms may be identified as semantic entities or potential semantic entities.

At 330, the search system may determine if an application ontology exists for the entities identified at 320. For example, an ontology store (235 in FIG. 2) may be consulted to determine if an ontology that includes one or more of the entities recognized as vocabulary terms at 320 is present in the store. If no such application ontology exists, the query may be sent to a search engine such as a search engine that uses keyword matching or other non-semantic search techniques, or other search system (335), to perform a non-semantic search. The non-semantic search may then be executed (365). A non-semantic search may be performed in addition to a semantic search, or it may be performed when a semantic search is not performed. The search engine may operate using keyword matching, weighted term ranking, and other search techniques. In an embodiment, the search engine may use techniques involving searchable data definitions as previously described. Search results may then be provided (370).

If an application ontology exists that contains the entities recognized in 320, the search query may be converted to a semantic search query at 340. The format of the semantic search query may depend upon the format of the ontology. For example, if the ontology is stored in a structured format for which a structured query language exists to query the ontology, the search query may be converted into the structure query language format. In this manner, a semantic query may be constructed in an ontological query language (i.e., in a language that may be used to query the ontology) from the original search query.

At 350, the semantic query constructed in 340 may be executed to query the ontology identified at 330. The results of the semantic search may be provided to the user at 370. In an embodiment, the semantic search results may be provided with results obtained by the search engine in 335.

In an embodiment, the original query 315 may be filtered at 360 and sent to a conventional or other search engine for further execution. A filtering process may be used for example, where a search engine stores content in a more user-friendly format than is available in an enterprise ontology. For example, a query 315 may include some terms that were recognized as ontology vocabulary terms at 320, and some terms that were not found in the vocabulary. In an embodiment, the enterprise ontology may be queried to obtain a first set of results that includes a unique key associated with an instance of a logical entity associated with an enterprise application. A second query may be constructed based on the unique key. For example, a search query may request all purchase orders of MegaCorp for which shipments were done in Tokyo. The semantic search may retrieve unique "Purchase Order" records that match the complex search criteria. A second query may be constructed that searches for all Purchase Order documents having a reference to a unique key that matches results obtained from the first query. The second query may be a non-semantic query, and may not be required to process the user's initial query.

In an embodiment, the first (semantic) query may be processed only if there is at least one term in the search query that matches a vocabulary term. If there is no match to a vocabulary term, the system may process the search query purely as a non-semantic search, since the lack of a vocabulary match may indicate that use of the ontology may provide little additional benefit. For example, a search that apparently lacks semantic meaning such as "ABC10001199XYZ" may indicate that a user is merely looking for that specific keyword, regardless of where it occurs relative to logical entities in an application. For example, the search query may be a model number or product serial number. For such a query, a semantic analysis may not used in processing the query.

Search results from the non-semantic search, the semantic search, or any combination thereof may be presented to a user or other querent at 370. In an embodiment, the results may indicate which results are related to an application ontology, such as by providing semantic information about the results. In another embodiment, semantic and conventional search results may be presented together.

In the manner described above, a search query may result in two searches being performed—a search performed in 335 (referred to as a "non-semantic" search to differentiate it from a semantic search) and a semantic search executed in 350. A combination of these two searches may be referred to as a hybrid search. A hybrid search may provide more relevant search results and more efficient execution than a non-semantic search standing alone. For example, keyword-matching and similar search techniques may be less precise, but may allow for rapid search execution by matching data that has not been crawled by a semantic crawler. In contrast, a semantic search may be more precise and provide more relevant information about the search results, but may require more execution time, prior processing, or both. A hybrid search may achieve the benefits of each search technique used, while incurring little or no additional processing time or search inaccuracy since each technique may compensate for the undesirable aspects of the other.

A system capable of executing a hybrid search may perform both the semantic search and the non-semantic search. In certain situations, only a semantic search may be performed. In other situations only a non-semantic search may be performed. A hybrid search system also may determine which search method or combination of search methods may be more effective, efficient, and/or return more relevant results. For example, as previously described, a hybrid search methodology may indicate that a semantic search provides little or no benefit if no search query terms are found to match terms in a vocabulary. Similarly, if some terms match vocabulary terms, a combination of a semantic search and a non-semantic search may be used.

In an embodiment, a subset of available logical entities may be described by an enterprise ontology. For example, a user may be using a subset of features offered by an enterprise application. When performing a search, the presence of an application ontology (such as, for example, in step 330) may indicate that a specific entity has been crawled by a semantic crawler, and an associated ontology has been generated. For example, in the embodiment illustrated in FIG. 2, the vocabulary may be built during the semantic crawling process, e.g., at 250. If no appropriate term is found in the vocabulary, it may indicate that an existing ontology is not appropriate for a specific search, or that no appropriate ontology has been generated. In such a case, a hybrid search system may "fall back" to a non-semantic search, such as a pure text matching method.

EXAMPLES

The following section describes examples of semantic searches and related analyses that may be performed by a system (semantic search system) capable of executing semantic searches. The examples provided below assume that an ontology is constructed using RDF and can be queried using SPARQL queries.

Example 1

| User Query: | STANDARD purchase orders |
|---|---|
| Tagged Output: | STANDARD/JJ purchase/NN orders/NNS |
| Tokens Found: | STANDARD, purchase, orders |
| Vocabulary Tokens: | purchase, orders |
| Instances Found: | STANDARD |
| SPARQL Query: | PREFIX ref: SELECT * {?x rdf:PO_HEADER_ID ?purchase. ?x ?prop6 'STANDARD'. } |

In Example 1, the query requests all purchase orders of type "STANDARD." The example shows how the entered query is analyzed for ontology entities and translated to a corresponding semantic search.

As previously described, a search query may be tagged to identify terms or types of terms in the query. A search system according to an embodiment of the invention may receive natural language or other text queries. A query may be processed by a part-of-speech tagger to produce the tagged output described in the examples. A specific example of a tagger suitable for use with embodiments of the invention is the Natural Language Parts of Speech Tagger from Stanford University. Such a tagger may tag terms in a search query based on the part of speech. This may be used, for example, to determine noun affinity of search terms within an enterprise vocabulary. As previously described, a vocabulary may identify business objects associated with an enterprise application, such as Vendor, Request for Quote, etc. The vocabulary also may identify synonyms (such as Supplier for Vendor), acronyms (RFQ for Request for Quote), or other related terms. A tagger may associate query terms with various identifiers, such as JJ, NN, and VBG for adjective, noun, and verb, respectively. Other tags may be used, such as the tags defined by the Parts of Speech Tagger described above.

After the query is tagged, it may be further processed to recognize nouns and match the nouns to vocabulary terms. Terms such as, for example, "EUR" and "Internal" may be identified that are specific instances of logical entities. Such an example is shown in Example 2. Based on the tagging, a semantic search engine may identify the class/object of which the terms are specific instances. After nouns are identified, the search engine may determine whether corresponding terms are included in an appropriate vocabulary. In some cases, the first noun having a matching vocabulary term may be identified as having the greatest affinity to the vocabulary, which may demonstrate more importance to the user.

Elements such as "prop6, " and "prop12" may be included in the semantic search to indicate "any property" for completion of an n-triple format.

Example 2

| User Query: | purchase orders vendor type lookup code internal currency code EUR |
|---|---|
| Tagged Output: | purchase/NN orders/NNS vendor/NN type/NN lookup/NN code/NN Internal/NNP currency/NN code/NN EUR/NNP |
| Tokens Found: | purchase, orders, vendor, type, lookup, code, Internal, |

-continued

| | |
|---|---|
| | currency, code, EUR |
| Vocabulary Tokens: | purchase, orders, vendor, type, lookup, code, currency, code |
| Instances Found: | Internal, EUR |
| SPARQL Query: | PREFIX ref: SELECT * {?x rdf:PO_HEADER_ID ?purchase. ?x ?prop59 'Internal'. ?x ?prop60 'EUR'. ?x rdf:VENDOR_ID ?vendor.} |

The query in Example 2 requests all purchase orders having a vendor type of "INTERNAL" and issued in Euros (EUR). As illustrated by Example 2, a semantic query may include elements of plain language queries, such as "currency code EUR," as well as query structures specific to the application or the enterprise system, such as "lookup code internal." Other query structures may be included. As previously described, the query may be analyzed to isolate terms suitable for a semantic search during execution of the search. For example, Purchase Order may have the first matching vocabulary term, suggesting that the user is looking for purchase orders with specific properties. In Example 2, the properties are (1) the associated vendor's assigned type is "Internal," and (2) the associated currency code is "EUR." Therefore, the resulting semantic query asserts both facts.

Example 3

| | |
|---|---|
| User Query: | vendor having invoice currency code EUR |
| Tagged Output: | vendor/NN having/VBG /invoice/JJ currency/NN code /NN EUR/NNP |
| Tokens Found: | vendor, invoice, currency, code, EUR |
| Vocabulary Tokens: | vendor, invoice, currency, code |
| Instances Found: | EUR |
| SPARQL Query: | PREFIX ref: SELECT * {?x rdf:INVOICE_NUM ?invoice. ?x ?prop12 'EUR'. ?x rdf:VENDOR_ID ?vendor.} |

This example shows a query for separate entities that have a semantic relationship, specifically, a query requesting vendors for whom there is at least one invoice in Euros. The "vendor" and "payable invoices" logical entities are involved in processing the query, but the association of a vendor with a payable invoice is through the associated purchase order, which is not present in the query. In the example system according to an embodiment of the invention, the semantic search system is "aware" of the intermediate implicit entries since they are described by an ontology associated with the application.

As previously described, the semantic query includes elements such as "prop12." In the example, "'?x ?prop12 'EUR'" searches for a subject (?x) where any property (?prop12) matches the string "EUR." Thus, the semantic search may indicate the object class of which specific entities are instances. The search query "vendor having invoice currency code EUR" is identified as having corresponding vocabulary terms of vendor, invoice, and currency code. From this, it is found that Vendor and Invoice are entities represented in an enterprise ontology. Therefore, the semantic query includes elements from the Vendor logical entity (i.e., ?x rdf:VENDOR_ID ?vendor) and elements from the Invoice logical entity (i.e., ?x rdf:INVOICE_NUM ?invoice). The key attributes VendorID, InvoiceID, and InvoiceNum may be extracted from the ontology. The semantic query also may include elements for recognized entities such as nouns that are instances of some class of objects (i.e., ?x ?prop12 'EUR'), which are different from the logical entities such as Vendor and Invoice. The semantic search in Example 3 also may utilize a rule joining Purchase Orders to Invoices, such as Vendor—>Purchase Orders—>Invoices. Thus, even if the query doesn't state a requirement with respect to Purchase Orders, relevant results still may be inferred.

Figure 4:
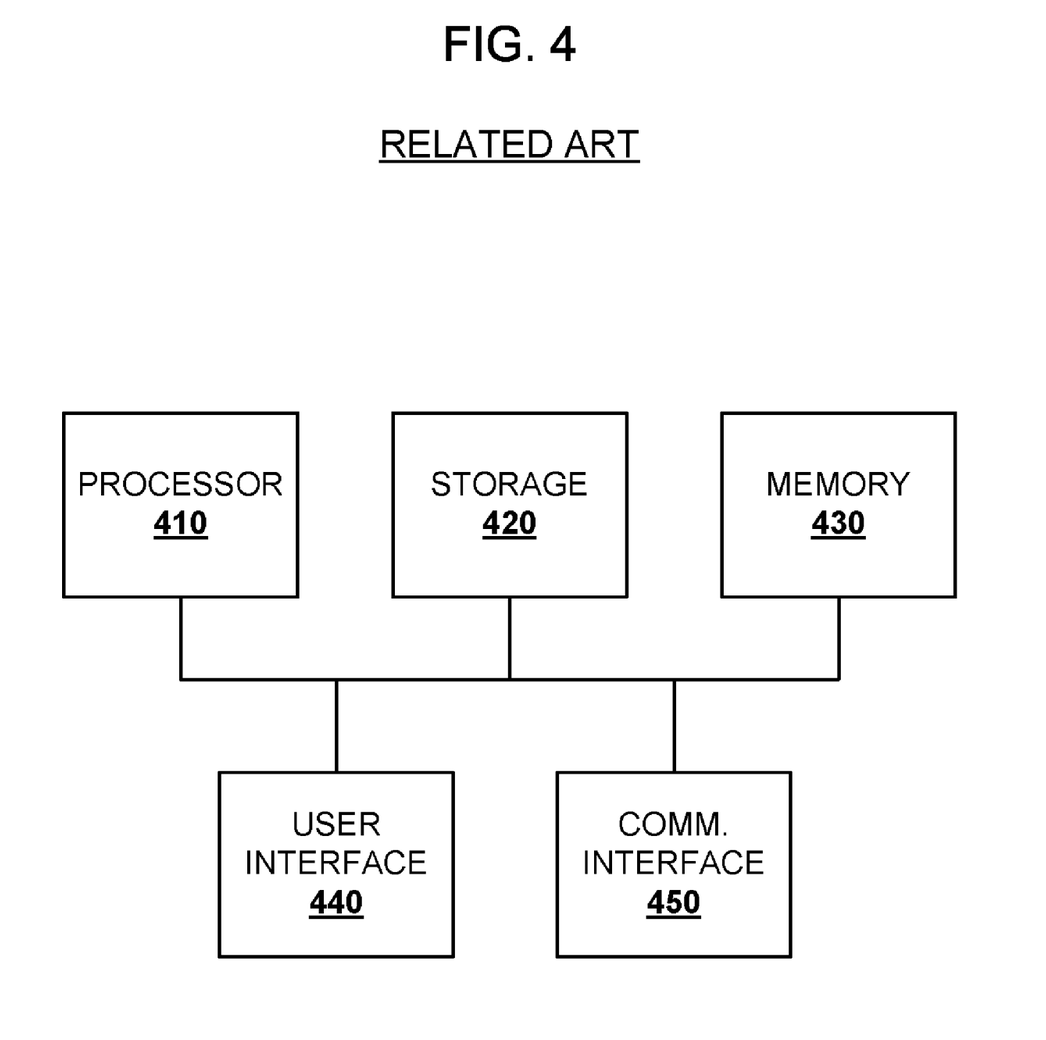
FIG. 4 shows a general-purpose computer suitable for implementing embodiments of the invention.

FIG. 4 shows a general-purpose computer suitable for implementing the systems and methods described herein. The computer may include a processor 410 capable of executing instructions stored on a computer-readable storage medium 420. Data used and created by the computer also may be stored on the storage medium 420. The instructions, data, or combinations thereof also may be stored in other memory 430, such as volatile or other memory. The computer may include a user interface 440 capable of providing data to, and receiving data from, a user of the computer. The computer also may include a communication interface 450, such as a network interface, capable of communicating with another computer, storage device, user, or other entity that may be directly connected to or remote from the computer. Other devices and structures may be included as known in the art.

In various embodiments of the invention, semantic statements may be stored in n-Triple format, RDF XML-Schema compliant format, or other similar structures or combinations of structures. Examples of semantic engines that may be used to store and process semantic information according to embodiments of the invention include Jena, Protégé, and the Oracle Database 11 g Semantic Engine.

In the foregoing description, for the purposes of illustration, methods were described in a particular order. It should be appreciated that the methods may be performed in a different order than that described. Additionally, unless indicated otherwise the methods may contain additional steps or omit steps described herein. The methods may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more computer-readable storage media, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. The methods also may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of performing a search, the method comprising:
  receiving a search query;
  parsing the search query to identify potential semantic entities to generate a set of tagged keywords for the search query;
  comparing the set of tagged keywords with a vocabulary to identify semantic entities included in the set of tagged keywords, wherein the vocabulary includes a list of terms used to construct semantic statements that describe relationships between entities described by data associated with an application;
  based on a comparison match, identifying one or more semantic entities;

determining that an application ontology exists for at least one of the one or more identified entities;
in response to determining that an application ontology exists, converting a first portion of the search query into a semantic search, wherein the semantic search is formatted based on a format of the associated ontology;
determining that an application ontology does not exist for at least one of the one or more identified entities;
in response to determining that an application ontology does not exist, converting a second portion of the search query into a non-semantic search;
combining, using a hybrid search system, the semantic search and the non-semantic search into a hybrid search;
based at least in part on the search query, determining, by the hybrid search system, whether to use only the semantic search, only the non-semantic search, or a combination of both the semantic search and the non-semantic search; and
executing the hybrid search using the determined combination of the semantic and the non-semantic search to generate one or more results.

2. The method of claim 1, further comprising:
generating an ontological statement;
identifying a semantic relationship between entities associated with data described by the search query; and
constructing the ontological statement to describe the semantic relationship.

3. The method of claim 2 wherein the semantic relationship is specified by the search query.

4. The method of claim 2, wherein the ontological statement is a resource description framework (RDF) statement.

5. A non-transitory computer-readable medium having sets of instructions stored thereon which, when executed by a computer, cause the computer to:
receive a search query;
parse the search query to identify potential semantic entities to generate a set of tagged keywords for the search query;
compare the set of tagged keywords with a vocabulary to identify semantic entities included in the set of tagged keywords, wherein the vocabulary includes a list of terms used to construct semantic statements that describe relationships between entities described by data associated with an application;
based on a comparison match, identify one or more semantic entities;
determine that an application ontology exists for at least one of the one or more identified entities;
in response to determining that an application ontology exists, convert a first portion of the search query into a semantic search, wherein the semantic search is formatted based on a format of the associated ontology;
determine that an application ontology does not exist for at least one of the one or more identified entities;
in response to determining that an application ontology does not exist, convert a second portion of the search query into a non-semantic search;
combine, using a hybrid search system, the semantic search and the non-semantic search into a hybrid search;
based at least in part on the search query, determine, by the hybrid search system, whether to use only the semantic search, only the non-semantic search, or a combination of both the semantic search and the non-semantic search; and
execute the hybrid search using the determined combination of the semantic and the non-semantic search to generate one or more results.

6. A system comprising:
a storage memory; and
a processor coupled with the storage memory, wherein the storage memory includes set of instructions stored thereon which, when executed by the processor, cause the processor to:
receive a search query;
parse the search query to identify potential semantic entities to generate a set of tagged keywords for the search query;
compare the set of tagged keywords with a vocabulary to identify semantic entities included in the set of tagged keywords, wherein the vocabulary includes a list of terms used to construct semantic statements that describe relationships between entities described by data associated with an application;
based on a comparison match, identify one or more semantic entities;
determine that an application ontology exists for at least one of the one or more identified entities;
in response to determining that an application ontology exists, convert a first portion of the search query into a semantic search, wherein the semantic search is formatted based on a format of the associated ontology;
determine that an application ontology does not exist for at least one of the one or more identified entities;
in response to determining that an application ontology does not exist, convert a second portion of the search query into a non-semantic search;
combine, using a hybrid search system, the semantic search and the non-semantic search into a hybrid search;
based at least in part on the search query, determine, by the hybrid search system, whether to use only the semantic search, only the non-semantic search, or a combination of both the semantic search and the non-semantic search; and
execute the hybrid search using the determined combination of the semantic and the non-semantic search to generate one or more results.

* * * * *

UNITED STATES PATENT AND TRADEMARK OFFICE
CERTIFICATE OF CORRECTION

PATENT NO. : 8,335,778 B2  
APPLICATION NO. : 12/212178  
DATED : December 18, 2012  
INVENTOR(S) : Ghosh et al.

Page 1 of 1

It is certified that error appears in the above-identified patent and that said Letters Patent is hereby corrected as shown below:

On page 2, in column 1, under "Other Publications", line 18, delete "Retrived" and insert -- Retrieved --, therefor.

On page 3, in column 2, under "Other Publications", line 3, delete "Vocabolary" and insert -- Vocabulary --, therefor.

In column 3, line 16, delete "results" and insert -- results. --, therefor.

Signed and Sealed this  
Nineteenth Day of March, 2013

Teresa Stanek Rea  
*Acting Director of the United States Patent and Trademark Office*